United States Patent [19]

Moore

[11] E Re. 28,787

[45] Reissued Apr. 27, 1976

[54] METHOD AND SYSTEM FOR HOT DE-OILING AND HOT BRIQUETTING

[75] Inventor: James E. Moore, Glenview, Ill.

[73] Assignee: K-G Industries, Inc., Rosemont, Ill.

[22] Filed: Feb. 21, 1973

[21] Appl. No.: 334,283

Related U.S. Patent Documents

Reissue of:

[64] Patent No.: 3,564,699
Issued: Feb. 23, 1971
Appl. No.: 886,337
Filed: Dec. 18, 1969

U.S. Applications:

[62] Division of Ser. No. 721,474, April 15, 1968, Pat. No. 3,497,190.

[52] U.S. Cl. ..... 29/403; 75/63; 110/7 R; 29/420.5; 134/2; 134/19; 266/901

[51] Int. Cl.[2] ..... B23Q 17/00; F27B 7/14

[58] Field of Search ..... 29/403; 425/DIG. 46; 266/33 R, 33 S, 2 R, 5 R; 75/63, 65 R; 110/7 R, 7 S, 14; 117/66 R; 134/2, 19, 65; 427/226

[56] References Cited

UNITED STATES PATENTS

| | | | |
|---|---|---|---|
| 2,302,980 | 11/1942 | Stern | 75/68 |
| 2,343,336 | 3/1944 | Somes | 75/65 R |
| 2,720,710 | 10/1955 | Erisman | 34/28 |
| 2,852,418 | 9/1958 | MacDonald | 134/2 |
| 2,925,821 | 2/1960 | MacDonald | 110/14 X |
| 3,163,929 | 1/1965 | Goodstein | 29/403 |
| 3,234,010 | 2/1966 | Mahoney | 266/33 R |
| 3,346,417 | 10/1967 | Ehrlich | 75/65 R |
| 3,510,563 | 5/1970 | Hall | 266/33 R |
| 3,544,367 | 12/1970 | Ehrlich et al. | 29/403 X |
| 3,567,201 | 3/1971 | Beckett | 266/33 S |

*Primary Examiner*—C. W. Lanham
*Assistant Examiner*—D. C. Reiley, III
*Attorney, Agent, or Firm*—McDougall, Hersh & Scott

[57] ABSTRACT

A system for hot de-oiling and hot briquetting material wherein the material is heated to burn off or vaporize foreign substances and is then transported to a briquetting machine for forming of the material into briquets. The improvements of the invention relate to furnace constructions and to methods of operation for heating the material. The furnace constructions comprise a combustion zone for the material being fed into the system. The material is introduced in two parts comprising coarser material introduced at an upper level and fines and air introduced at a lower level with combustion gases from the lower level being fed upwardly for contact with the coarser material. An outlet is defined by the constructions and means are provided for moving the materials within the furnace to the outlet and for delivering the materials to briquetting equipment.

10 Claims, 3 Drawing Figures

Figure 1:
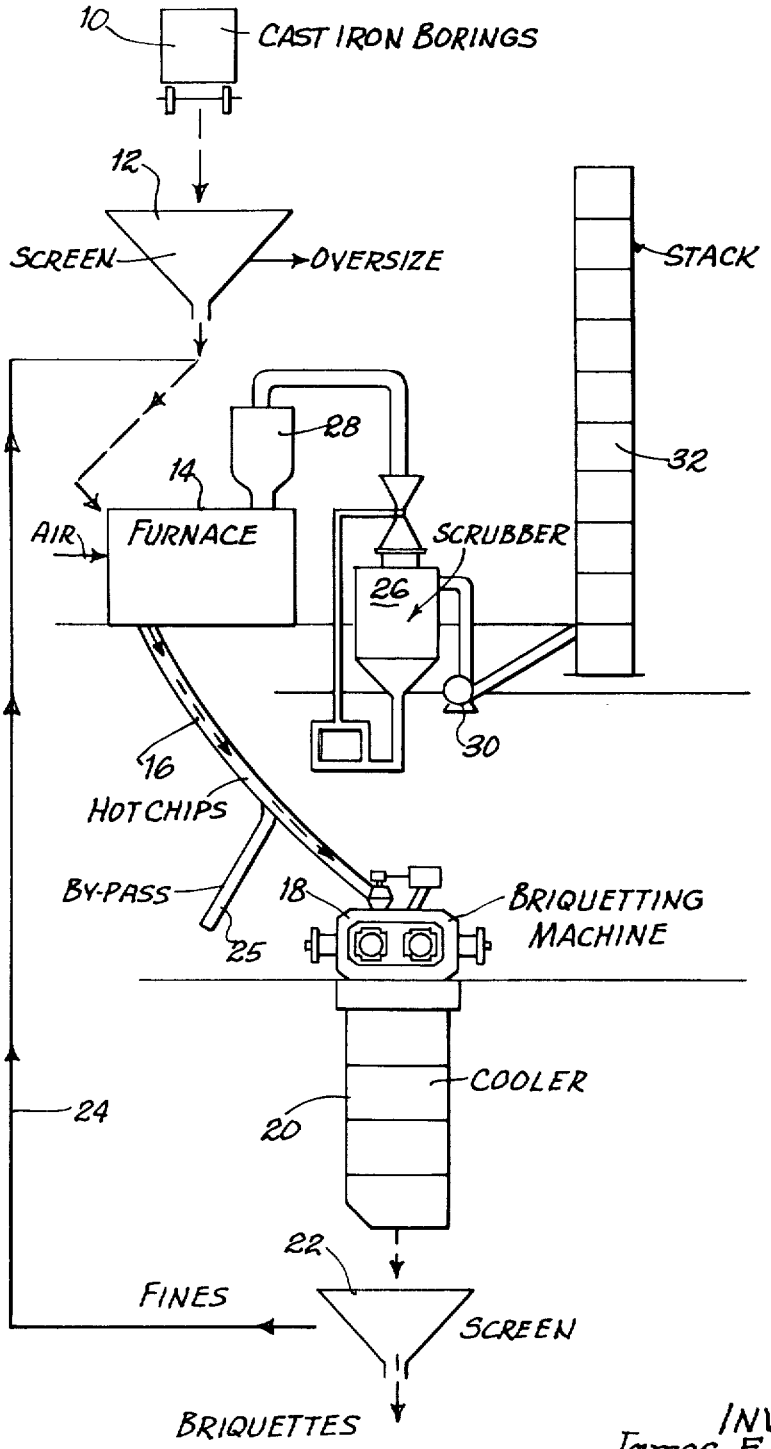

INVENTOR
James E. Moore
by McDougall, Hersh & Scott
Att'ys

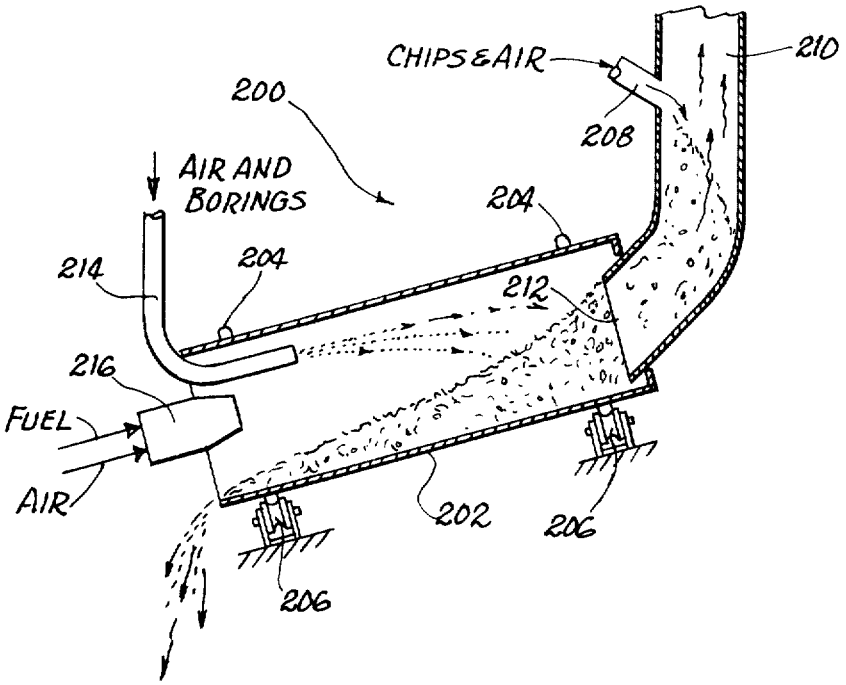
FIG. 2
FIG. 3
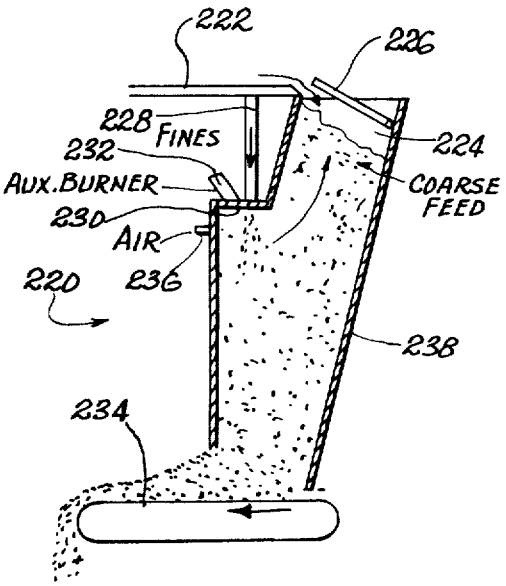

METHOD AND SYSTEM FOR HOT DE-OILING AND HOT BRIQUETTING

Matter enclosed in heavy brackets [ ] appears in the original patent but forms no part of this reissue specification; matter printed in italics indicates the additions made by reissue.

This application is a division of copending application Ser. No. 721,474, filed Apr. 15, 1968, and now Pat. No. 3,497,190.

This invention relates to a system for hot de-oiling and hot briquetting. The invention is particularly concerned with the processing of materials such as crushed turnings, chips, borings, and other metal scrap, for example, those materials consumed in melting shops.

The briquetting of scrap materials such as turnings and borings has been recognized as a highly economical and efficient procedure. Turnings and borings have a composition which makes them highly suitable for use in charging operations in a foundry. These materials are readily available at low cost and, to add to the efficiency, they are often produced in a machine shop near a melting shop.

The turnings and borings have certain drawbacks, however, due to the fact that they are very small dimensionally and are usually coated with oil and water. These characteristics make them highly undesirable as additives in a cupola or in an electric furnace.

By hot de-oiling and hot briquetting the turnings and borings, the drawbacks referred to can be overcome. The briquettes produced are of satisfactory size and density so that the original size of the turnings and borings is of no consequence when briquets are formed for addition to a melting furnace. Similarly, the oil and water on the turnings and borings in vaporized off as a regular step in the briquetting procedure so that the briquetted product will be virtually free of any oil and water traces.

The presence of oil on the turnings and borings presents another distinct advantage during hot briquetting. Thus, the oil serves as a fuel which is consumed as the oil is removed. This provides an ideal means for controlling temperature and non-oxidizing conditions in the combustion zone of a furnace employed for removing the oil. The air-to-fuel ration within the furnace can be maintained at a desired level to provide a temperature of desired magnitude.

The system of this invention is also designed to eliminated adverse conditions which can arise to the burning of the oil. Specifically, excess oil and smoke can cause highly undesirable air pollution, and afterburner means are provided for burning the excess oil to eliminated this problem. In addition, the discharge from the system can be scrubbed by suitable mechanisms to further reduce the introduction of contaminants into the air.

It is a general object of this invention to provide improvements in hot briquetting and hot de-oiling, particularly with respect to improvements in furnace constructions employed for removing foreign substances such as oil and water from the surfaces of the materials and simultaneously preheating the materials for briquetting or other use.

It is a more particular object of this invention to provide furnace constructions of the type described which are relatively low in cost and which operate with a high degree of efficiency, dependability and economy.

It is a still further object of this invention to provide a furnace design which is particularly suitable for the treatment of discharge from the furnace for purposes of burning excess oil vapor and for avoiding the entrainment of dust in off-gases whereby little or no dust is carried from the furnace to the afterburner, scrubber and/or atmosphere.

These and other objects of this invention will appear hereinafter and for purposes of illustration, but not of limitation, specific embodiments of the invention are shown in the accompanying drawings in which:

FIG. 1 is a schematic illustration of a hot briquetting system of the type contemplated by this invention; and, FIGS. 2 and 3 are vertical sectional views of furnace constructions suitable for use in a briquetting system of the type shown in FIG. 1.

The systems of this invention are specifically designed for the processing of material such as turnings and borings. In accordance with prior practice, the turnings and borings are placed in a furnace construction for purposes of burning off foreign substances such as oil from the surfaces of the turnings and borings. The hot materials are then transported to a briquetting machine for forming into briquets or utilized for other purposes. Although the invention will be described with reference to the treatment of metal, other materials can also be advantageously handled in these systems. For example, ores which have a fuel associated with the material when it is introduced into the furnace can be treated in accordance with the principles to be described.

In prior constructions employed for heating of the turnings and borings, it was thought necessary to provide a carefully constructed furnace which included different zones characterized by distinct operations. Thus, a central zone of such furnaces provided a primary combustion zone into which material to be briquetted was introduced. Means were provided for blowing the material into the furnace to scatter the particles since this was thought necessary to provide sufficient heat transfer.

A supplemental heating zone equipped with burners was located beneath the primary zone. Rakes were provided for gradually moving the material so that the material would eventually drop through the two heating zones.

Above the primary zone, an afterburner was provided. By the introduction of air into this afterburner zone, unburned oil vapors would be burned in the afterburner thereby reducing contamination of the atmosphere. Rakes were utilized in this zone for returning settled dust which collected on the floor of the afterburner chamber.

The instant invention provides systems for accomplishing hot processing of metal pieces in a more economical and efficient manner when compared with prior systems. It has been found that the furnaces described herein can be utilized for purposes of heating of turnings and borings to the extent that these materials can be briquetted for use as charge materials or otherwise processed. Costs are materially reduced by providing furnaces of efficient design.

The arrangements are particularly suitable in systems where the inlet and outlet openings for the materials are located to provide maximum production rates, minimum installation costs and minimum operational costs. Additional improvements are available where the flow of gases is related to the feed to provide maximum efficiency. Finally, the arrangement permits relatively low operating temperatures, low gas velocity, minimum agitation of dust and minimum entrainment of dust in the exhaust.

FIG. 1 comprises a schematic illustration of a system for hot briquetting. In this system cast iron borings are transported, as shown at 10, to a sizing screen 12. The screen 12 removes over-sized material whereby the material fed to the furnace 14 and the product of the furnace will be of relatively uniform dimension.

The hot chips are delivered from the furnace through line 16 to a briquetting machine 18. The briquets produced by the briquetting machine are transported through a cooler 20 and are then passed across a screen 22. The fines comprising particles which are separate from the briquets are fed back as shown at 24 for recycling through the furnace. In the event that the discharge from the furnace is not to be briquetted, a bypass 25 is provided in line 16.

A scrubber 26 is provided for collecting the gases issuing from the furnace through afterburner 28. A pump 30 withdraws the gases from the scrubber for passage through a stack 32 into the atmosphere.

FIG. 2 illustrates a construction 200 which includes a rotating cylinder 202. The cylinder defines a pair of tracks 204 which engage rollers 206. Suitable drive means, not shown, are provided for rotating the cylinder 202. Material is introduced through a line 208 which communicates with chute 210. The material will naturally move downwardly toward the outlet 212 of the chute at which time the material is received in the cylinder 202. Air and small particles are introduced into the cylinder 202 through the pipe 214. The small particles introduced through the pipe 214 may comprise borings from a machine shop, and they carry oil whereby combustion will occur within the cylinder 202. An auxiliary burner 216 is provided for initially igniting the material introduced through the pipe 214. This burner may also be utilized for supplementing burning throughout the operation of the construction in the event that fuel on the particles is not sufficient.

The chips introduced at 208 are preferably larger and heavier particles which will not be entrained in the exhaust gases. The exhaust gases will, however, heat up these chips, and at some point in their travel, the chips, which may also be covered with oil, will be ignited. The mass of chips serves as a filtering means to prevent entrainment of small particles in the exhaust while the combustion gases from the cylinder 202 serve to preheat the chips introduced into the system.

By locating the cylinder 202 on an incline, a natural flow of product will result. Obviously, auxiliary means for removing material from the rotary furnace could be provided.

It will be appreciated that the preheating of the material introduced into the chute 210 could result in vaporization of oil whereby this oil would not be available as fuel. For this reason, the material introduced through the pipe 214 is intended as the material which will provide the fuel necessary for the operation. Some oil may be provided by the material entering through the inlet 208; however, this material may also comprise chunks of material which are to be incorporated in a briquetted product or heated for other purposes, and which does not have any fuel introduced along with it.

FIG. 3 illustrates the construction 220 which operates in a manner similar to the construction 220. In this instance, the feed is provided by means of a screening conveyor 222. The coarse portions of the feed will move to the end of the screening conveyor for entry through the opening provided between the upper end of the chute 224, and the adjustable damper 226. The fines sift through the conveyor 222 for passage through line 228 to an opening provided in the wall section 230 of the construction. An auxiliary burner 232 is preferably located at the point of entry of these fines.

In the operation of the construction 220, the fines bearing oil will ignite as they enter the construction, and this will provide heat for passage out through the opening provided in the section 224. Since the coarse material will be subjected to this heat, portions of oil will be removed through vaporization. Any remaining oil on the coarse material will ignite as the material moves downwardly into the combustion zone. A conveyor 234 is provided at the bottom of the construction for continuously removing material from the construction. Air may be introduced at 234 to insure that sufficient air will be available to support the necessary combustion.

The construction of FIG. 3 is provided with an inclined wall 238; however, a vertical arrangement is also contemplated. Obviously, the configuration of the construction of FIG. 3 as well as that of the other construction described could be varied considerably while still achieving the results to be accomplished.

In the systems described, the aim is to provide a high furnace capacity in the sense that the tonnage per hour of production is high relative to the size of the furnace. Rates of 30 tons per hour are obtainable without the difficulty in such constructions.

The high capacity is possibly due to the fact that the oil associated with the particles will ignite immediately adjacent the particle surfaces. This provides for high heat transfer, and thus rapid heating of the particles so that the particles can be moved through the constructions at a high rate.

These results can be accomplished without the need for introducing the particles of material in a stream of air under high pressure. In the construction of FIG. 3 for example, fines are introduced through an inlet 232 under the influence of gravity. Since there is no agitation of the materials, the stirring up of dust can be kept to a minimum so that there will be a low incidence of dust entrainment in the exhaust gases.

The units described can be readily provided with afterburner constructions, scrubbers, and other pollution control means. The ease with which these facilities can be applied is an extremely important feature from the standpoint of installation costs.

An additional benefit arises from the fact that a reducing atmosphere or an atmosphere low in oxidizing ingredients is provided in all instances. Thus, the air which is introduced into the combustion zone is controlled to provide only enough air to support combustion. The hot particles are thereafter only exposed to the combustion gases which contain little or no oxygen whereby oxidation of the particles can be virtually eliminated. Excess air is only introduced in the afterburner zone of the various constructions.

It will be understood that various changes and modifications may be made in the above described systems which provide the characteristics of this invention without departing from the spirit thereof.

That which is claimed is:

1. In a system for heating material formed of a mass of small, individual metallic pieces carrying foreign substances at least part of which are combustible whereby the burning of said substances assists in the heating of the material, and for forming the hot metallic pieces into briquets, the improvement comprising a furnace construction for heating the material, said furnace construction including a combustion zone, at least one inlet opening adjacent the combustion zone, means for feeding a portion of said material carrying said substances through said inlet opening for movement of the material directly into the combustion zone, a second inlet opening located in an upstream position relative to said first inlet opening, and means for feeding a separate portion of said material into said second inlet opening, a first outlet defined by the furnace, means for moving the material fed through said inlet openings across said combustion zone towards said first outlet with the material fed through said second inlet moving past said first inlet, and a second outlet defined by said furnace upstream of said second inlet opening, the gases resulting from said combustion passing out through the material fed through said second inlet opening and out of said furnace through said second outlet, and wherein hot pieces of material previously in said combustion zone serve to ignite material newly introduced into the combustion zone, a briquetting machine, and including means connected to said construction for delivering said metallic pieces from said first outlet directly to said briquetting machine for thereby forming briquets made up of large numbers of said pieces.

2. A system in accordance with claim 1 wherein said first outlet is defined adjacent the bottom of said combustion zone, said material dropping downwardly into said first outlet after being heated in the combustion zone.

3. A system in accordance with claim 1 wherein said combustion zone is located within a rotating cylinder, a pipe forming said first inlet opening and communicating with said cylinder for introducing a portion of said material directly into the combustion zone, said second outlet comprising a stack, said second inlet opening being formed in said stack for introducing said separate portion of material into said stack whereby gases resulting from said combustion filter through the additional material as they are exhausted from the construction.

4. A construction in accordance with claim 3 wherein said cylinder is inclined with respect to the horizontal and wherein said pipe for introducing material into the cylinder carries a high pressure air stream which entrains the material for passage into the cylinder.

5. A construction in accordance with claim 1 including a separator for handling said material whereby coarser pieces of material are separated from finer pieces of material, said finer pieces being introduced into said first inlet opening adjacent the combustion zone, said second inlet opening providing for the introduction of said coarser pieces, and wherein the combustion gases pass from said combustion zone in contact with said coarser pieces prior to passage of the combustion gases through said second outlet.

6. A method for heating a mass of small, individual metallic pieces in a furnace construction wherein the pieces carry foreign substances at least part of which are combustible whereby the burning of said substances assists in the heating of the pieces, the improvement comprising the steps of continuously introducing a portion of said pieces through first furnace inlet means directly into a combustion zone adjacent the inlet means whereby the combustible substances in the material are ignited by hot pieces previously introduced in the combustion zone, providing a second furnace inlet means upstream of said first inlet means, introducing a separate portion of said pieces into said second inlet means, providing a first outlet for said pieces and progressively moving the pieces introduced toward said outlet, providing a second outlet for the combustion gases at a position upstream of said second inlet means, said second outlet being located whereby the combustion gases move through and in contact with the pieces introduced through said second inlet means as the gases progress toward said second outlet, providing a briquetting machine in direct association with said first outlet, delivering hot pieces to said briquetting machine, and forming said hot pieces into briquets made up of a plurality of such pieces.

7. A method in accordance with claim 6 including the steps of providing a separator for said material and separating coarser pieces of material from finer pieces of material, introducing said finer pieces into said first inlet means adjacent the combustion zone, introducing said coarser pieces into said second inlet means whereby the combustion gases pass from said combustion zone in contact with said coarser pieces prior to passage of the combustion gases through said second outlet.

8. A method in accordance with claim 6 wherein air is introduced into the combustion zone along with said material, the amount of air introduced being controlled to provide approximately the amount necessary to support combustion whereby oxidizing conditions in the area of the combustion zone are minimal.

*9. An apparatus for reclaiming metal from adulterated metal chips by removing surface adhering adulterants from the chips, the apparatus comprising:*

*a. an inclined tumbler barrel rotatably mounted to a frame;*

*b. means for rotatably driving the barrel;*

*c. heating means for heating and injecting gas into the lower end of the barrel;*

*d. exit means at the lower end of the barrel for removing hot chips from the barrel; and*

*e. means in addition to and separation from said heating means for inserting an oxidizing agent into the barrel at a position intermediate its ends wherein adulterated chips may be inserted in the upper end of the barrel while being drivingly rotated, hot gas may be passed from the lower end of the barrel to and out the higher end, and hot metal chips relatively free of surface adhering adulterants may be withdrawn through the exit means.*

*10. An apparatus according to claim 9 wherein said oxidizing agent inserting means comprises a tube entirely separate from any burner tube extending into one end of the barrel, the tube having an outlet orifice within the barrel and having means external to the barrel for connection solely to a supply of said oxidizing agent.*

* * * * *